United States Patent
Nagao et al.

(10) Patent No.: US 11,072,138 B2
(45) Date of Patent: *Jul. 27, 2021

(54) SPECTACLE LENS MANUFACTURING SYSTEM

(71) Applicant: TOKAI OPTICAL CO., LTD., Okazaki (JP)

(72) Inventors: Atsushi Nagao, Okazaki (JP); Hiroaki Watanabe, Okazaki (JP); Shingo Ono, Okazaki (JP); Hiroshi Ueno, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 118 days.

This patent is subject to a terminal disclaimer.

(21) Appl. No.: 15/839,027

(22) Filed: Dec. 12, 2017

(65) Prior Publication Data

US 2018/0133989 A1 May 17, 2018

Related U.S. Application Data

(63) Continuation of application No. PCT/JP2016/068405, filed on Jun. 21, 2016.

(30) Foreign Application Priority Data

Jun. 22, 2015 (JP) .............................. JP2015-124973

(51) Int. Cl.
  *B29D 11/00* (2006.01)
  *B29C 64/112* (2017.01)
  (Continued)

(52) U.S. Cl.
  CPC ...... *B29D 11/00961* (2013.01); *B29C 64/112* (2017.08); *B29D 11/0048* (2013.01);
  (Continued)

(58) Field of Classification Search
  CPC .......... B29D 11/00961; B29D 11/0048; B29D 11/00432; B29D 11/00442;
  (Continued)

(56) References Cited

U.S. PATENT DOCUMENTS

| 4,693,446 A | 9/1987 | Orlosky |
| 2003/0181133 A1* | 9/2003 | Siders ....................... B24B 1/00 451/5 |

(Continued)

FOREIGN PATENT DOCUMENTS

| EP | 0 234 567 A1 | 9/1987 |
| JP | H10-175149 A1 | 6/1998 |

(Continued)

OTHER PUBLICATIONS

Extended European Search Report (Application No. 16814354.3) dated Dec. 19, 2018.

(Continued)

*Primary Examiner* — Joseph S Del Sole
*Assistant Examiner* — Mohamed K Ahmed Ali
(74) *Attorney, Agent, or Firm* — Burr & Brown, PLLC

(57) ABSTRACT

A spectacle lens manufacturing system includes resin material filling means which fills a lens mold with a lens material (heat-curable resin material), and at least a portion of the lens mold is formed by a three-dimensional printer. The lens mold includes a front lens mold having a rear surface that defines a front surface of a spectacle lens, a rear lens mold having a front surface that defines a rear surface of the spectacle lens, and a side peripheral lens mold having an (Continued)

inner surface that defines a side periphery of the spectacle lens. The side peripheral lens mold is formed by the three-dimensional printer.

12 Claims, 12 Drawing Sheets

(51) Int. Cl.
*B33Y 10/00* (2015.01)
*G02C 7/02* (2006.01)
*B33Y 50/02* (2015.01)
*B33Y 80/00* (2015.01)
*G02B 1/04* (2006.01)

(52) U.S. Cl.
CPC .. *B29D 11/00432* (2013.01); *B29D 11/00442* (2013.01); *B33Y 10/00* (2014.12); *B33Y 50/02* (2014.12); *B33Y 80/00* (2014.12); *G02B 1/041* (2013.01); *G02C 7/02* (2013.01); *B29D 11/00528* (2013.01); *B29K 2909/08* (2013.01)

(58) Field of Classification Search
CPC .... B29D 11/00528; G02B 1/041; G02C 7/02; B29C 64/112; B33Y 10/00; B33Y 50/02; B33Y 80/00
See application file for complete search history.

(56) References Cited

U.S. PATENT DOCUMENTS

| | | |
|---|---|---|
| 2005/0088750 A1 | 4/2005 | Hasei |
| 2005/0179148 A1 | 8/2005 | Tridon et al. |
| 2013/0286073 A1 | 10/2013 | Blessing et al. |
| 2015/0115486 A1 | 4/2015 | Meschenmoser et al. |

FOREIGN PATENT DOCUMENTS

| | | |
|---|---|---|
| JP | 4228845 B2 | 2/2009 |
| JP | 2010-155926 A1 | 7/2010 |
| JP | 2013-198988 A1 | 10/2013 |
| JP | 2013-213936 A1 | 10/2013 |
| JP | 2014-502931 A1 | 2/2014 |
| JP | 2014-182278 A1 | 9/2014 |
| JP | 2015-094942 A1 | 5/2015 |

OTHER PUBLICATIONS

International Search Report and Written Opinion (Application No. PCT/JP2016/068405) dated Sep. 20, 2016.
Chinese Office Action (Application No. 201680036222.6) dated Nov. 16, 2018 (with English translation).

* cited by examiner

SPECTACLE LENS MANUFACTURING SYSTEM

CROSS-REFERENCE TO RELATED APPLICATIONS

This application is a Continuation of International Application No. PCT/JP2016/068405, filed on Jun. 21, 2016, which claims the benefit of Japanese Patent Application No. 2015-124973 filed on Jun. 22, 2015, the disclosures of which are incorporated by reference herein in their entireties.

FIELD OF THE INVENTION

The present invention relates to a system for manufacturing spectacle lenses.

DESCRIPTION OF RELATED ART

A spectacle lens manufacturing device disclosed in Japanese Laid-Open Patent Publication No. 10-175149 described below has been known.

In this manufacturing device, an object-side surface and an eyeball-side surface of a semi-finished lens (round lens) having a round external shape are subjected to NC (Numerical Control) processing, thereby manufacturing a spectacle lens conformed to prescription values including a spherical power (S power). In a spectacles shop or the like, the external shape of the manufactured spectacle lens is processed into a rim shape such as a droplet shape smaller than the round lens so as to be fixed into a spectacle frame.

When eyeglasses are manufactured by fitting spectacle lenses into a spectacle frame, the shape of a portion (rim), of the spectacle frame, to which each spectacle lens is fitted varies among different spectacle frames. In addition, in order to exert an optical effect, an optical center of the spectacle lens needs to coincide with the position of a pupil (eye point) of a wearer, or the eye point needs to be located at a predetermined position in the spectacle lens in a case where, for example, a prism is provided. Meanwhile, since the eye point varies from wearer to wearer, a round lens is processed into a rim-shaped lens after obtaining information about the eye point and the rim shape of the spectacle frame.

In the spectacle lens manufacturing device described above, by processing semi-finished lenses, spectacle lenses conformed to the prescription values are efficiently manufactured with reduced inventories thereof.

However, since each spectacle lens is manufactured as a round lens, lens shape processing for the external shape for fitting the lens into the spectacle frame takes time and labor, and a portion cut out from the round lens in the lens shape processing is wasted.

Therefore, it is conceivable that, using a three-dimensional printer for optical structure disclosed in Japanese Translation of PCT International Application Publication No. 2014-502931 described below, a spectacle lens having a rim-shaped contour and having an object-side surface shape and an eyeball-side surface shape conformed to prescription values is formed by deposition of droplets of an ink that is curable by ultraviolet (UV) light.

SUMMARY OF THE INVENTION

Japanese Translation of PCT International Application Publication No. 2014-502931 discloses the spectacle lens manufactured using deposition of ink droplets by the printer. However, due to deposition of ink droplets, actually, the spectacle lens is not a rim-shaped spectacle lens having presently required performance.

That is, almost none of existing inks that are curable by UV and available at reasonable cost has sufficient transparency, transmissivity, and the like (optical performance) as a spectacle lens and has, after being cured, sufficient strength, hardness, durability, and the like (physical performance). In addition, at present, the ink droplets jetted are not very fine, which causes roughness at the object-side surface and the eyeball-side surface after being cured. Therefore, the resultant lens cannot be used as a spectacle lens unless the surfaces and the like are ground. However, almost none of the existing inks sufficiently bears such processing after being cured while maintaining various performances.

Therefore, an object of the present invention is to provide a spectacle lens manufacturing system which allows a surface shape to be obtained with high accuracy, reduces portions to be wasted by lens shape processing, and requires less time and labor for lens shape processing.

In order to attain the aforementioned object, according to a first aspect of the disclosure a spectacle lens manufacturing system includes a lens mold to be filled with a lens material, and fluid resin discharge means configured to discharge a curable fluid resin, in which the fluid resin discharge means forms at least a portion of the lens mold by discharging the fluid resin.

According to a second aspect of the disclosure, in the aforementioned disclosure, a spectacle lens manufacturing system includes the lens mold having a front lens mold having a rear surface that defines a front surface of a spectacle lens, a rear lens mold having a front surface that defines a rear surface of the spectacle lens, and a side peripheral lens mold having an inner surface that defines a side periphery of the spectacle lens, and the fluid resin discharge means forms a part including at least a portion of an inner surface of the side peripheral lens mold.

According to a third aspect of the disclosure, in the aforementioned disclosure, a spectacle lens manufacturing system includes contour shape data acquisition means configured to obtain contour shape data indicating a contour shape of the spectacle lens, in which the fluid resin discharge means forms at least a portion of the inner surface of the side peripheral lens mold into a shape according to the contour shape data.

According to a fourth aspect of the disclosure, in the aforementioned disclosure, a spectacle lens manufacturing system includes the contour shape data is transmitted from the orderer side computer.

According to a fifth aspect of the disclosure, in the aforementioned disclosure, a spectacle lens manufacturing system includes the fluid resin discharge means that forms at least a portion of the inner surface of the side peripheral lens mold into a shape in which a handling portion to be held instead of a portion to be the spectacle lens is added to the contour shape indicated by the contour shape data.

According to a sixth aspect of the disclosure, in the aforementioned disclosure, a spectacle lens manufacturing system includes edge shape data acquisition means configured to obtain edge shape data indicating an edge shape of a spectacle frame into which the spectacle lens is to be fitted, and the fluid resin discharge means forms at least a portion of the inner surface of the side peripheral lens mold into a shape according to the edge shape data.

According to a seventh aspect of the disclosure, in the aforementioned disclosure, a spectacle lens manufacturing system includes the edge shape data that is transmitted from the orderer side computer According to an eighth aspect of the disclosure, in the aforementioned disclosure, a spectacle lens manufacturing system includes at least one of the front lens mold and the rear lens mold that is made of glass.

According to a ninth aspect of the disclosure, in the aforementioned disclosure, a spectacle lens manufacturing system includes the lens material that is a heat-curable resin material.

According to a tenth aspect of the disclosure, in the aforementioned disclosure, a spectacle lens manufacturing system includes the fluid resin discharge means that is a three-dimensional printer.

According to an eleventh aspect of the disclosure, in the aforementioned disclosure, a spectacle lens manufacturing system includes the fluid resin discharge means that is a resin dispenser.

According to a twelfth aspect of the disclosure, in the aforementioned disclosure, a spectacle lens manufacturing system includes curing means configured to cure the fluid resin, in which the fluid resin is a UV-curable resin, and the curing means is UV irradiation means.

According to a thirteenth aspect of the disclosure, in the aforementioned disclosure, a spectacle lens manufacturing system includes curing means configured to cure the fluid resin, in which the fluid resin is a heat-curable resin, and the curing means is heating means.

According to a fourteenth aspect of the disclosure, in the aforementioned disclosure, a spectacle lens manufacturing system includes the fluid resin that is a naturally-curing resin cured due to change in components thereof after being discharged.

The present invention provides a spectacle lens manufacturing system that allows a surface shape to be obtained with high accuracy, reduces portions to be wasted by lens shape processing, and requires less time and labor for lens shape processing.

DETAILED DESCRIPTION OF THE INVENTION

Exemplary embodiments of the present invention will be described below with reference to the drawings as appropriate. The present invention is not limited to the exemplary embodiments described below.

First Embodiment

<<Structures and the Like>>

Figure 1:
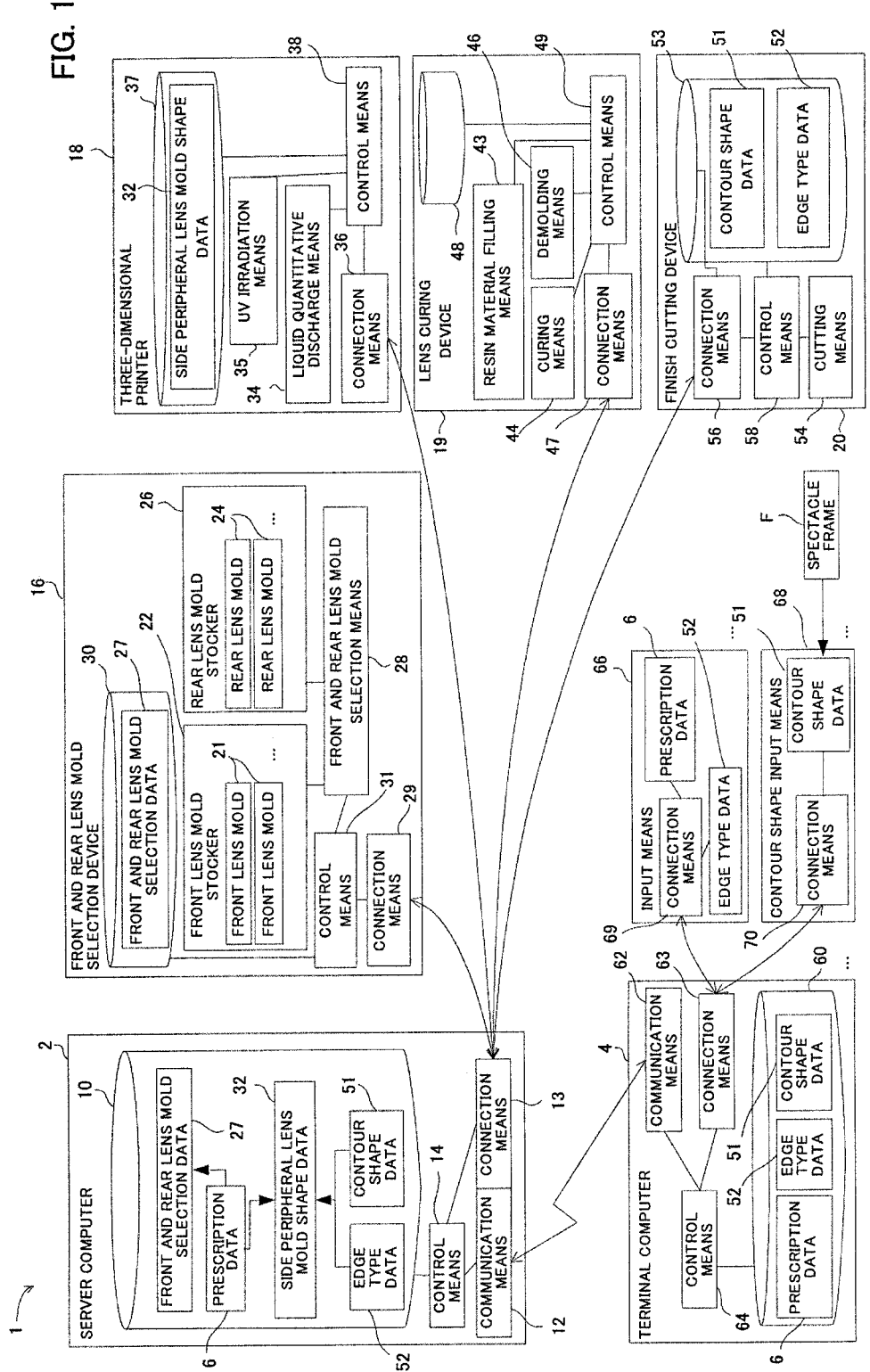
FIG. 1 is a block diagram showing a spectacle lens manufacturing system according to a first embodiment of the present invention.

A spectacle lens manufacturing system 1 according to a first embodiment of the present invention is configured to manufacture a plastic spectacle lens having a rim shape or a shape closer to the rim shape than a round lens. As shown in FIG. 1, the spectacle lens manufacturing system 1 includes a server computer (server) 2 installed in a spectacle lens manufacturer (order reception side), and a plurality of terminal computers (terminals) 4, 4, . . . each being installed on an orderer side and communicably connected to the server 2 via the Internet or the like. Prescription data 6 and the like are transmitted/received between the server 2 and each terminal 4. Each terminal 4 is an orderer-side computer.

The number of the terminals 4 may be one. The terminals 4 may be omitted. Regardless of the number of the terminals 4, the prescription data 6 and the like obtained from the orderer side through a facsimile or the like may be inputted to the server 2. When the terminals 4 are omitted, the server 2 or the like undertakes the function of the terminal 4.

The server 2 includes storage means 10 which stores therein various data including the prescription data 6, and various programs, communication means 12 and connection means 13 through which transmission and reception of various data are performed, and control means 14 which controls these means on the basis of a program or the like.

A front and rear lens mold selection device 16, a three-dimensional printer 18 as fluid resin discharge means, a lens curing device 19, and a finish cutting device 20 are connected to the server 2 so as to be communicable with each other. At least any one of these devices may be integrated with the server 2, and at least two of these devices may be integrated with each other. The ratio of the numbers of these devices including the server 2 may be varied. For example, a plurality of at least one of the front and rear lens mold selection device 16, the three-dimensional printer 18, the lens curing device 19, and the finish cutting device 20 may be provided. Further, another connection mode that enables direct or indirect transmission/reception of data with the server 2 may be adopted. For example, a connection mode may be adopted in which the server 2 is connected to the front and rear lens mold selection device 16, the front and rear lens mold selection device 16 is connected to the three-dimensional printer 18, the three-dimensional printer 18 is connected to the lens curing device 19, and the lens curing device 19 is connected to the finish cutting device 20.

The front and rear lens mold selection device 16 includes a front lens mold stocker 22 in which various front lens molds 21 are stored, a rear lens mold stocker 26 in which various rear lens molds 24 are stored, front and rear lens mold selection means 28 which selects a front lens mold 21 and a rear lens mold 24 on the basis of front and rear lens mold selection data $27_3$ and takes out the selected molds from the front lens mold stocker 22 and the rear lens mold stocker 26, connection means 29, storage means 30 which stores therein various data and programs, and control means 31 which controls these means. The front and rear lens mold selection means 28 is, for example, a robot hand. Both the front lens mold 21 and the rear lens mold 24 are made of glass, but may be made of another material, or may be made of materials different from each other. For convenience of explanation, a side closer to an object is "front", and a side closer to an eyeball is "rear".

Figure 2:
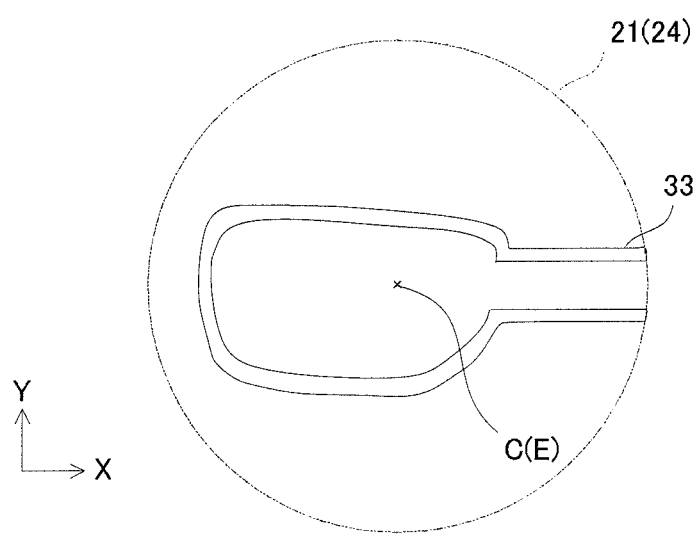
FIG. 2 is a front view of a side peripheral lens mold.

The three-dimensional printer 18 is configured to cure a UV-curable liquid resin by irradiating the resin with UV, thereby forming a side peripheral lens mold 33 (FIG. 2) having a shape based on side peripheral lens mold shape data 32. The three-dimensional printer 18 includes liquid quantitative discharge means 34, UV irradiation means 35 as curing means, such as a UV emitting LED, connection means 36, storage means 37 which stores therein various data and programs, and control means 38 which controls these means. In the liquid quantitative discharge means 34, the liquid resin quantified based on the side peripheral lens mold shape data 32 is discharged while being irradiated with UV by the UV irradiation means 35, and deposition of the cured liquid resin is shaped according to the side peripheral lens mold shape data 32, thereby providing the side peripheral lens mold 33.

As the three-dimensional printer 18, for example, a three-dimensional printer that discharges a heat-curable liquid resin may be used. In short, a three-dimensional printer in which a fixed amount of liquid (ink) is sequentially discharged and deposited on the basis of various shape data by the liquid quantitative discharge means 34, and cured by the curing means (UV irradiation means 35 or heating means) may be used. Curing of the liquid by the curing means may be performed when the liquid is being discharged, or when the liquid is deposited (adhered), or when a predetermined time has passed from the discharge (deposition). The curing means may be provided in a device other than the three-dimensional printer 18 (fluid resin discharge means), or may be configured as a separate and independent device. The three-dimensional printer 18 may be a device other than one that accumulates and cures liquid, as long as it performs additive manufacturing (additive manufacturing means). For example, a three-dimensional metal additive manufacturing device may be used, in which, for example, metal powder (solid) spread in a layer shape on a table is irradiated with laser on the basis of shape data, to melt and solidify only the irradiated portion (e.g., to a thickness of about several tens microns) and then metal powder is further spread thereon in a layer shape and similarly irradiated with laser, and this process is repeated as appropriate (e.g., several thousand times) to obtain a metal structure (side peripheral lens mold 33). Further, the three-dimensional printer 18 may be a combination of the device that accumulates and cures liquid and the three-dimensional metal additive manufacturing device. In addition, the liquid resin may be a resin having high viscosity. In short, a fluid resin that is a resin having fluidity may be used.

The side peripheral lens mold shape data 32 preferably represents a three-dimensional shape, but may represent a two-dimensional shape. In the latter case, assuming that the side peripheral lens mold shape data 32 represents the vertical and horizontal shapes, a thickness perpendicular to the vertical and horizontal directions may have a predetermined distribution such as a fixed thickness. Hereinafter, for convenience of explanation, in a case where a lens is in an upright position as it is usually worn, a horizontal direction is an X-axis direction, a vertical direction is a Y-axis direction, and a direction perpendicular to an XY plane (thickness direction of the lens) is a Z-axis direction. In addition, in the X-axis direction, a rightward direction when standing in front of the lens and facing the lens is a positive direction, and the rightward direction is, for the wearer, an X-axis negative direction. Further, in the Y-axis direction, an upward direction when standing in front of the lens and facing the lens is a positive direction (also for the wearer). In the Z-axis direction, a rearward direction is a positive direction. The manner of setting the respective axes and their positive directions may be changed as appropriate.

For at least one of the front lens mold 21 and the rear lens mold 24 taken out by the front and rear lens mold selection device 16, a side peripheral lens mold 33 is formed by the three-dimensional printer 18. A lens mold 42 (FIG. 3) is formed such that the front lens mold 21 and the rear lens mold 24 are in contact with the side peripheral lens mold 33.

Lens mold fixing means such as an adhesive tape or an easily-removable adhesive agent may be provided, which fixes at least two of the front lens mold 21, the rear lens mold 24, and the side peripheral lens mold 33 in the lens mold 42 to prevent these molds from being misaligned. The lens mold fixing means may be applied to the lens mold 42 by a lens mold fixing means applying device which is provided in the front and rear lens mold selection device 16 or the three-dimensional printer 18 or provided independently. Alternatively, the lens mold fixing means may be manually applied. The side peripheral lens mold 33 may be formed so as to have viscosity or adhesive property (may be made of a material having viscosity or adhesive property after being cured), and fixed to the front lens mold 21 or the rear lens mold 24. Alternatively, at least one of the front lens mold 21 and the rear lens mold 24 may have viscosity or adhesive property.

Figure 4:
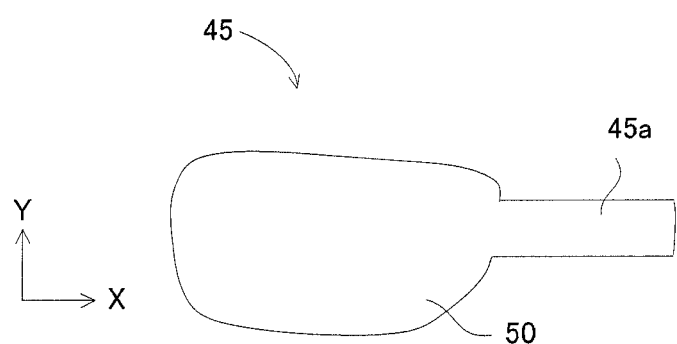
FIG. 4 is a front view of an unfinished spectacle lens.

The lens curing device 19 includes resin material filling means 43 as lens material filling means which fills a space, in the lens mold 42, surrounded by the front lens mold 21, the rear lens mold 24, and the side peripheral lens mold 33 with a heat-curable resin material as a lens material, lens curing means 44 which applies heat to the lens mold 42 filled with the heat-curable resin material, according to a predetermined mode (temperature, time, etc.) based on the type of the resin material, or the like, demolding means 46 which removes, from the lens mold 42, an unfinished spectacle lens 45 (FIG. 4) formed from the heat-curable resin material being cured in the lens mold 42, connection means 47, storage means 48 which stores therein various data and programs, and a control means 49 which controls these means. The lens curing means 44 is, for example, a chamber provided with a heater, and the demolding means 46 is, for example, a robot hand. Instead of the heat-curable resin material, another lens material such as a UV-curable resin material may be used. Instead of the heat-curable resin, another plastic such as a UV-curable resin may be used.

The finish cutting device 20 includes a storage means 53 which stores therein various data such as contour shape data 51 (FIG. 5) of a rim-shaped spectacle lens 50 (refer to FIG. 4), and edge type data 52 representing the type of the shape of an edge that is a side peripheral surface of the rim-shaped spectacle lens, and various programs, cutting means 54 which cuts the unfinished spectacle lens 45, connection means 56, and control means 58 which controls these means. The cutting means 54 is, for example, grindstone and chuck which are NC controlled. The cutting means 54 machines the unfinished spectacle lens 45 so as to have an external shape based on the contour shape data 51, thereby providing the spectacle lens 50. The unfinished spectacle lens 45 has a portion to be the spectacle lens 50 and a bar-shaped handling portion 45a attached to the portion to be the spectacle lens 50. The unfinished spectacle lens 45 can be held, by holding the handling portion 45a, without touching the portion to be the spectacle lens 50, instead of holding the portion to be the spectacle lens 50. Thus, the handling portion 45a is used for handling the unfinished spectacle lens 45 in process steps after the unfinished spectacle lens 45 has been formed.

Each terminal 4 includes storage means 60 which stores therein various data including prescription data 6, and various programs, communication means 62 and connection means 63 through which transmission and reception of the various data are performed, and control means 64 which controls these means on the basis of a program or the like.

Input means 66 through which the prescription data 6 and the edge type data 52 are inputted, and contour shape input means 68 through which contour shape data 51 (particularly when making discrimination between left and right, left contour shape data 51L and right contour shape data 51R as viewed from the wearer, and the same applies hereinafter) is inputted, are communicably connected to each terminal 4 via connection means 69 and 70, respectively, like the connection of the three-dimensional printer 18 and the like to the server 2.

The input means 66 is implemented by a pointing device such as a mouse, a keyboard, a touch panel, or a combination thereof. The input means 66 receives, through operation thereof, inputs of the edge type data 52 and the prescription data 6, and transmits the data to the terminal 4 via the connection means 69.

The prescription data 6 includes, for example, S power, astigmatic power (C power), astigmatic axis, additional power, prism, edge thickness, color, and interpupillary distance. Although it is preferred that the prescription data 6 for left and right lenses are individually provided, the prescription data 6 common to left and right lenses or independent prescription data 6 can be used as appropriate.

Figure 6A:
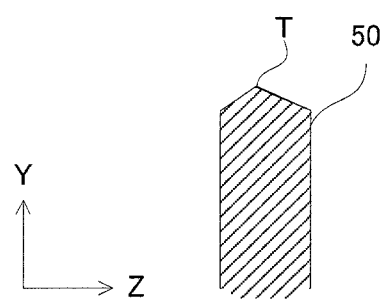
FIG. 6A shows a cross-sectional view of edge shapes of a spectacle lens having a bevel shape.
Figure 6B:
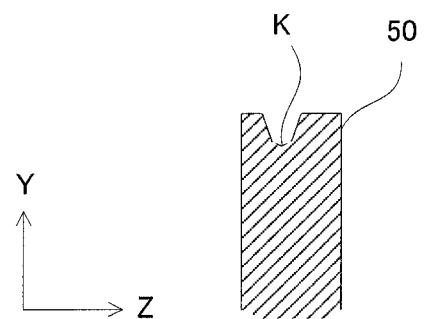
FIG. 6B shows a cross-sectional view of edge shapes of a spectacle lens having a groove shape.

When the cross section of the edge of the spectacle lens 50 has a bevel shape T projecting in a "A" shape (triangular shape) (FIG. 6A), the edge type data 52 is represented by T-1, T-2, and the like, depending on the height of the projection, or the distance from the front peripheral edge to the tip of the projection. When the cross section has a groove shape K recessed in a "U" shape (FIG. 6B), the edge type data 52 is represented by K-1, K-2, or the like, depending on the depth thereof, or the distance from the front peripheral edge to the deepest portion of the groove. When the cross section is flat (flat ground), the edge type data 52 is represented by H-1, H-2, or the like. For example, the edge type data 52 being T-1 represents a bevel shape having a projection height of 0.7 millimeters (mm), and having the tip at a position apart by a horizontal distance of 1.0 mm from the front peripheral edge. The edge type data 52 being K-1 represents a groove shape having a predetermined width, having a depth of 0.6 mm, and having the deepest portion at a position apart by a horizontal distance of 1.0 mm from the front peripheral edge. The edge type data 52 may include data representing other shapes such as a bevel shape in which the cross section of the edge has a trapezoidal shape. In this case, for example, the trapezoidal bevel shape may be represented by D-1, D-2, or the like. Alternatively, the triangular bevel shape may be represented by T-a-1 while the trapezoidal bevel shape may be represented by T-b-1 or the like. The edge type data 52 may be obtained individually for left and right lenses.

The contour shape input means 68 receives an input of the contour shape data 51 representing the rim-shaped contour of the spectacle lens 50. The contour shape data 51 is transmitted to the terminal 4 via the connection means 70 on the basis of a control by control means (not shown) of the contour shape input means 68. The contour shape input means 68 is, for example, a spectacle frame tracer which converts the inner periphery shapes of left and right rims of a spectacle frame F into the contour shape data 51 by probe scanning. The spectacle lens 50 is formed into a rim shape corresponding to the rim shape (rim inner periphery shape) of the spectacle frame F so as to be fitted to the rim of the spectacle frame F. The contour shape data 51 is an aggregation of XY coordinate values of a predetermined number of coordinate acquisition points (e.g., 100 points) with respect to a predetermined origin point, regarding the rim inner periphery shape of the spectacle frame F. Adjacent coordinate acquisition points are selected so as to have equal angles with respect to the origin point or an optional point other than the origin point. The contour shape data 51 includes coordinate values of an eye point E (the position of a pupil, when the spectacle lens is worn, projected onto the XY plane, which coincides with an optical center C of the spectacle lens 50). The contour shape data 51 is obtained as data representing the tip of the bevel shape, the deepest portion of the groove shape, or the contour of the flat ground portion, but may be obtained as data representing the contour of the front surface (or the rear surface) of the spectacle lens 50. The rim shape of the spectacle lens 50 (the external shape when the spectacle frame F is worn) is represented by the contour shape represented by the contour shape data 51, and the edge shape (side periphery cross-sectional shape) represented by the edge type data 52. In a case of using a spectacle frame F having no annular rim, such as a rimless (two-point) frame, or a spectacle frame F having no annular rim before the spectacle lens 50 is fitted thereto, such as a nylol frame, a dummy rim having a desired rim shape of the spectacle lens 50 (or a dummy rim-shaped lens) is scanned by the spectacle frame tracer, so that the contour shape data 51 may be obtained. Regardless of presence/absence of an annular rim, the contour shape data 51 may be inputted from the input means 66 or a scanner that reads a shape described on a sheet, or may be inputted by selecting existing data. The contour shape data 51 may be obtained through a predetermined calculation performed on the data representing the rim inner periphery shape. That is, the contour shape data 51 may not completely coincide with the rim shape of the spectacle frame F. The edge type data 52 may also not completely coincide with the rim shape of the spectacle frame F.

The coordinate acquisition points may be selected such that adjacent coordinate acquisition points are at equal intervals or have the same shape and length. Although it is preferred that the contour shape data 51 for left and right lenses are individually provided, only either of the data may be obtained and, by using the obtained data, the contour shape data 51 for the other lens may be calculated so as to have a symmetrical shape with respect to the Y axis. Further, the contour shape data 51 may be an aggregation of three-dimensional coordinate values also including Z-axis coordinate values. Further, the edge type data 52 may be detected by the contour shape input means 68. Instead of or in addition to the edge type data 52, the rim shape of the spectacle frame F corresponding to the edge (e.g., the shape of a groove corresponding to the bevel shape, or the shape of a projection corresponding to the groove) may be converted into data by the spectacle frame tracer, and the edge shape data may be used. The contour shape data 51 and the edge type data 52 (or the edge shape data) may be made common to provide rim shape data representing the rim shape of the spectacle lens 50. The edge type data 52 may be omitted to finish the edge so as to have a predetermined cross-sectional shape. In addition, the eye point E may be handled not as the contour shape data 51 but as the prescription data 6 or the like. The eye point E may be processed as an origin point for the coordinate acquisition points or the like. A portion or the whole of the calculation regarding the contour shape data 51 and the like may be performed in the terminal 4. Further, the spectacle frame tracer may be connected to the server 2 (in the manufacturer), and the spectacle frame F may be transmitted to the server 2 (manufacturer) side and set in the spectacle frame tracer, and then the contour shape data 51 may be inputted to the server 2.

<<Operation and the Like>>

Figure 7:
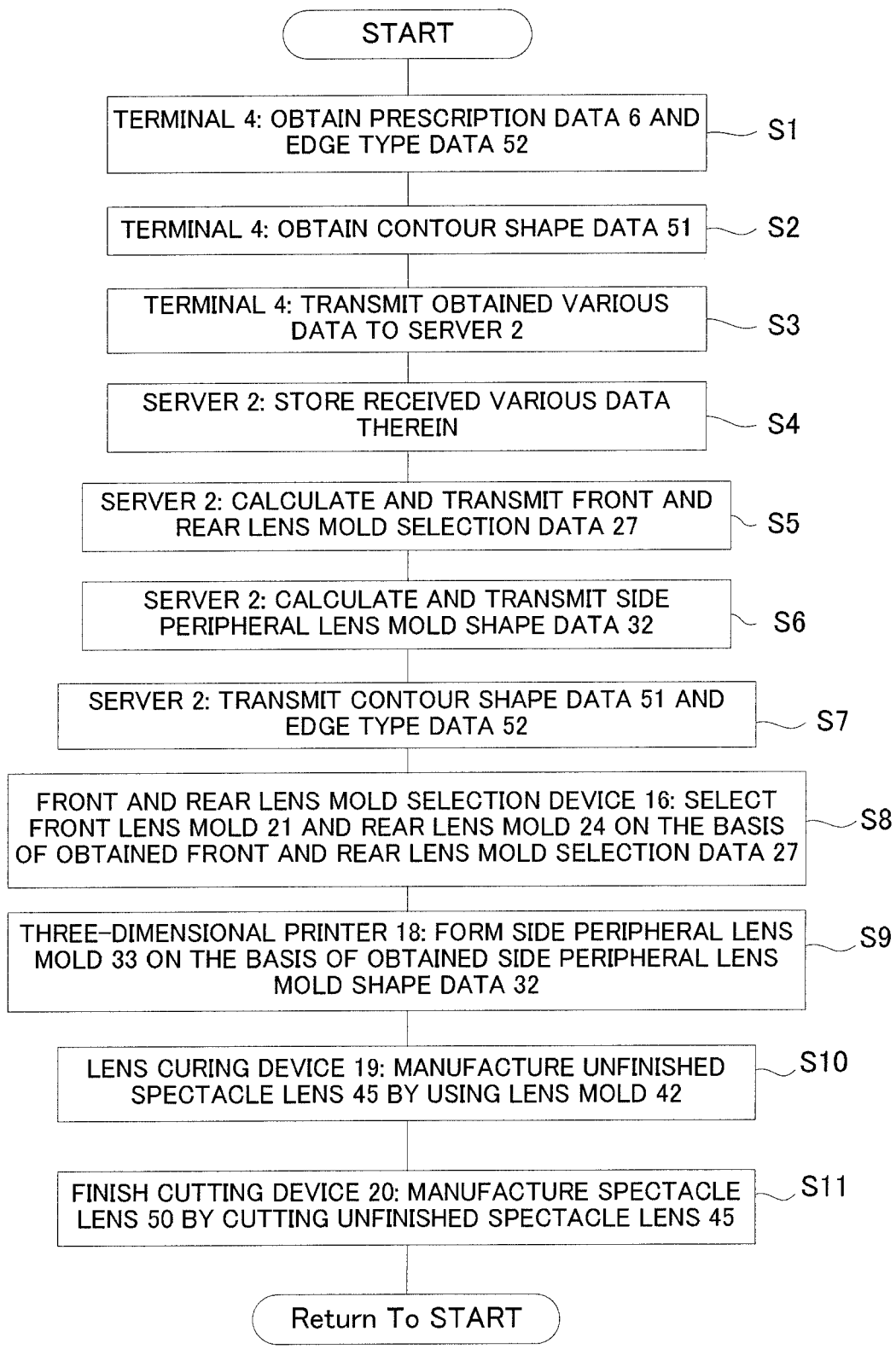
FIG. 7 is a flowchart according to an example of operation of the spectacle lens manufacturing system shown in FIG. 1.

FIG. 7 is a flowchart showing an example of the operation of the spectacle lens manufacturing system 1. Regarding the operations of the respective devices, the operations of the control means therefor will be described as the operations of the devices as appropriate. For example, the operation of the control means 14 of the server 2 is appropriately described as the operation of the server 2. In the following description, process steps are indicated by "S" as appropriate. Each step may be changed to one or more steps performing an equivalent process as appropriate. The order in which the steps are performed may be changed as appropriate.

The terminal 4 installed on the orderer side including a spectacles shop receives the prescription data 6 and the edge type data 52 from the input means 66 (S1). For example, "S power of −3.00" and "edge thickness of 5.0 mm" are inputted as the prescription data 6, and "T-1" is inputted as the edge type data 52.

Figure 5:
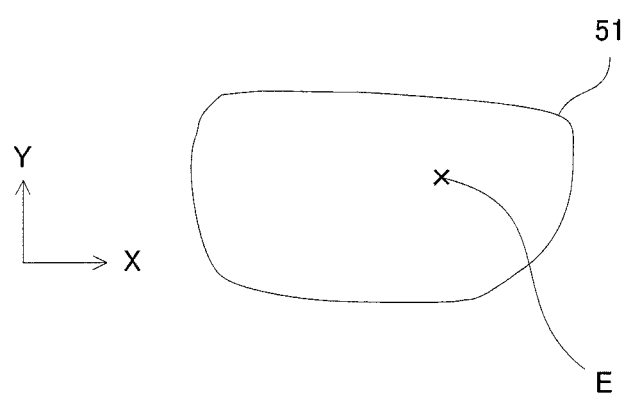
FIG. 5 is a schematic diagram showing contour shape data.

The spectacle frame F or the like is set in the contour shape input means 68 and the contour shape data 51 is obtained, and the terminal 4 receives the contour shape data 51 (S2). For example, data representing the shape as shown in FIG. 5 is inputted as the contour shape data 51R.

The terminal 4 assigns an identification mark to a set of the prescription data 6, the contour shape data 51, and the edge type data 52 so as to distinguish this set from other sets, and then stores the data set. Upon receiving an input of "order acknowledged", the terminal 4 transmits the data and the identification mark to the server 2 (S3). At least one of the terminal 4, the contour shape input means 68, and the server 2, which receives the contour shape data 51, configures contour shape data acquisition means. At least one of the terminal 4, the input means 66, and the server 2, which receives the edge type data 52, configures edge shape data acquisition means.

Upon receiving the set of the prescription data 6, the contour shape data 51, and the edge type data 52, the server 2 stores therein the data set according to the identification mark (S4).

Then, the server 2 calculates the front and rear lens mold selection data 27 from the prescription data 6, and transmits the data 27 to the front and rear lens mold selection device 16 (S5). For example, provided that the refractive index of the spectacle lens 50 is 1.60 because the S power is −3.00, the server 2 generates data indicating that the front lens mold 21 having a rear surface 21a (FIG. 3) whose radius of curvature is 200.00 mm and the rear lens mold 24 having a front surface 24a (FIG. 3) whose radius of curvature is 100.00 mm are to be selected. The rear surface 21a of the front lens mold 21 defines the front surface of the spectacle lens 50, and the front surface 24a of the rear lens mold 24 defines the rear surface of the spectacle lens 50. The server 2 stores, for each S power, a set of the radius of curvature of the rear surface 21a of the front lens mold 21 and the radius of curvature of the front surface 24a of the rear lens mold 24 (the type of the front and rear lens molds) as a database, and accesses the database on the basis of the S power in the prescription data 6 to obtain the front and rear lens mold selection data 27. A portion or the whole of the calculation of the front and rear lens mold selection data 27 may be performed in the front and rear lens mold selection device 16. The prescription data 6 may include material data regarding the material of the spectacle lens 50, and the server 2 may obtain the front and rear lens mold selection data 27, taking into account the refractive index in the case where the spectacle lens 50 is manufactured by using the material indicated by the material data. The material data may indicate the property of the material such as refractive index or transmissivity. Alternatively, the material data may be calculated on the basis of the prescription data 6 (S power or the like).

The server 2 calculates the side peripheral lens mold shape data 32 on the basis of the prescription data 6, the contour shape data 51, and the edge type data 52, and transmits the data 32 to the three-dimensional printer 18 (S6). A portion or the whole of the calculation of the side peripheral lens mold shape data 32 may be performed in the three-dimensional printer 18.

For example, the server 2 calculates, as base shape data of the side peripheral lens mold shape data 32, a ring shape data having an inner surface corresponding to the contour shape data 51 as shown in FIG. 5, having an outer surface that is offset radially outward by a predetermined amount with respect to the inner surface, and having a thickness corresponding to the edge thickness of the prescription data 6. The base shape data also includes the eye point E. The server 2 may calculate the thickness (distribution) of the base shape data of the side peripheral lens mold shape data 32 with reference to, instead of the edge thickness of the prescription data 6, the S power, or the radius of curvature of the rear surface 21a of the front lens mold 21 and the radius of curvature of the front surface 24a of the rear lens mold 24 which are indicated by the front and rear lens mold selection data 27. Alternatively, the server 2 may calculate data of a more accurate thickness (distribution) with reference to both the S power or the like and the edge thickness.

The server 2 refers to, as handling portion shape data of the side peripheral lens mold shape data 32, a result of calculation performed in advance on two band-shaped portions extending along the X axis with a predetermined interval therebetween, and calculates a thickness thereof in a similar manner to that for the base shape data. Then, the server 2 adds the handling portion shape data so as to be connected to a predetermined position in the base shape data.

Further, the server 2 changes the inner surface of the base shape data of the side peripheral lens mold shape data 32 so as to have a surface shape corresponding to the edge shape indicated by the edge type data 52. If the edge type data 52 is T-1, the server 2 calculates a recess that fits the bevel shape. That is, the server 2 changes the original data of the inner surface to data, taking into account the shape data of the bevel groove having the deepest portion of 0.7 mm at a position apart by a horizontal distance of 1.0 mm from the front peripheral edge.

In addition, the server 2 transmits the contour shape data 51 and the edge type data 52 to the finish cutting device 53 (S7). A portion or the whole of the calculation performed by the server 2 may be performed in other devices including the terminal 4.

Upon receiving the front and rear lens mold selection data 27, the front and rear lens mold selection device 16 stores the data 27 therein to refer to the data 27. The front and rear lens mold selection means 28 selects the front lens mold 21 and the rear lens mold 24 of the type indicated by the front and rear lens mold selection data 27 from the front lens mold stocker 22 and the rear lens mold stocker 26, respectively, and transfer means (not shown) transfers the selected molds 21 and 24 to the three-dimensional printer 18 (S8). According to the aforementioned front and rear lens mold selection data 27, the front lens mold 21 having the rear surface 21a whose radius of curvature is 200.00 mm and the rear lens mold 24 having the front surface 24a whose radius of curvature is 100.00 mm are selected.

Upon receiving the side peripheral lens mold shape data 32 as well as the front lens mold 21 and the rear lens mold 24 corresponding to the data 32, the three-dimensional printer 18 forms, on the basis of the side peripheral lens mold shape data 32, the side peripheral lens mold 33 on at least one of the rear surface 21a of the front lens mold 21 and the front surface 24a of the rear lens mold 24 (S9). The three-dimensional printer 18 forms the side peripheral lens mold 33 in such an arrangement that the eye point E of the side peripheral lens mold shape data 32 coincides with the optical center C of the front lens mold 21 (rear lens mold 24).

The three-dimensional printer 18, by sequentially referring to the side peripheral lens mold shape data 32, controls scanning in the liquid quantitative discharge means 34 and the discharge amount of the liquid resin, and controls UV irradiation to the liquid resin by the UV irradiation means 35, thereby forming the cured side peripheral lens mold 33. As the UV-curable liquid resin, for example, at least one of a resin containing acrylate as a principal component (acrylate-based UV-curable resin) and a resin containing epoxy resin as a principal component (epoxy-based LTV-curable resin) is used. The former immediately stops its curing reaction when UV irradiation is stopped, but volume change before and after curing is relatively great, and the volume after curing contracts relatively greatly as compared to the volume before curing. The latter continues its curing reaction even after UV irradiation is stopped, but volume change before and after curing is relatively small, and the volume after curing does not contract so much as compared to the volume before curing. Among the multiple types of UV-curable resins described above, one suited to the accuracy, the curing speed (efficiency), or the like required of the lens mold may be selected and used, or the UV-curable resins may be mixed as appropriate according to the accuracy or the efficiency, and used.

After formation of the side peripheral lens mold 33, the three-dimensional printer 18 arranges the side peripheral lens mold 33, the front lens mold 21, and the rear lens mold 24 such that the mold 21 and the mold 24 are joined via the mold 33, to assemble the lens mold 42, and transfer means (not shown) transfers the lens mold 42 to the lens curing device 19. The joining of the front lens mold 21, the rear lens mold 24, and the side peripheral lens mold 33, that is, the assembly of the lens mold 42, may be performed in the lens curing device 19. The three-dimensional printer 18 or other three-dimensional printers may form a portion or the whole of the front lens mold 21, or may form a portion or the whole of the rear lens mold 24, or may form a portion or the whole of each of the front lens mold 21 and the rear lens mold 24, on the basis of the front and rear lens mold selection data 27, the prescription data 6, and the like. For example, a base body of the front lens mold 21 may be prepared, and an additional part that is made of a UV-curable resin and has a rear surface 21a conforming to the S power may be formed on a rear surface of the base body. A base body of the rear lens mold 24 may be prepared, and an additional part that has a front surface 24a conforming to the S power may be formed on a front surface of the base body. In these cases, the surface including the additional part made of the UV-curable resin may be finished by grinding means or the like.

Alternatively, a side peripheral lens mold 33 made of glass or the like may be selected from a stocker therefor. The side peripheral lens mold 33 may be formed by depositing a UV-curable resin on at least a portion of an inner surface of a base body of the side peripheral lens mold 33 by the three-dimensional printer 18. The inner surface of the base body of the side peripheral lens mold 33 may have, for example, a shape capable of including the entirety of the unfinished spectacle lens 45, and a UV-curable resin having an inner surface corresponding to the side peripheral lens mold shape data 32 may be added to a portion or the whole of the inner surface of the base body. Regarding the base body of the side peripheral lens mold 33, only one type of base body may be present, or multiple types of base bodies may be present. In the latter case, one base body may be selected from a base body stocker on the basis of the side peripheral lens mold shape data 32 or the like. The base body of the side peripheral lens mold 33 may be made of glass, and may have an elliptical shape.

Upon receiving the lens mold 42, the lens curing device 19 pours a heat-curable resin material into the lens mold 42 and cures the heat-curable resin material, thereby manufacturing an unfinished spectacle lens 45 made of the heat-curable resin (S10).

Specifically, first, the resin material filling means 43 of the lens curing device 19 fills the lens mold 42 (a space surrounded by the front lens mold 21, the rear lens mold 24, and the side peripheral lens mold 33) with the heat-curable resin material. The resin material filling means 43 pours the resin material through a filling port J (FIG. 3) of the lens mold 42. Since the unfinished spectacle lens 45 (FIG. 4) has the handling portion 45a, the filling port J is formed to communicate with the inside of the lens mold 42. The resin material filling means 43 may finish filling when detecting, with a sensor, that the resin material overflows the lens mold 42, or may finish filling when the resin material reaches a filling amount that has been calculated in advance by the resin material filling means 43 or another device such as the server 2. The lens curing device 19 may receive the lens mold 42 in a state where at least one of the front lens mold 21, the rear lens mold 24, and the side peripheral lens mold 33 is separated, and fill the lens mold 42 in this state with the resin material, and thereafter, put the front lens mold 21, the rear lens mold 24, and the side peripheral lens mold 33 together. For example, the lens curing device 19 may receive the front lens mold 21 having the side peripheral lens mold 33 joined to the rear surface 21a thereof, and the rear lens mold 24 individually, and pour the resin material into a space surrounded by the front lens mold 21 and the side peripheral lens mold 33, and thereafter, put the rear lens mold 24 over the side peripheral lens mold 33. By completing assembly of the lens mold 42 after filling of the resin material as described above, it is possible to fill the lens mold 42 with the resin even when the filling port J is not exposed at the side periphery. In addition, the lens curing device 19 may receive the prescription data 6 (material data) from the server 2 or the like, and the resin material filling means 43 may select a resin material indicated by the material data regarding the spectacle lens 50, and fill the lens mold 42 with the selected resin material.

The conventional round lens is equivalent to be formed by filling the entire space between the round front lens mold 21 and the round rear lens mold 24 with the resin material. Therefore, the amount of the resin material used in the spectacle lens manufacturing system 1 is significantly reduced. Since the resin material need not be usable in the three-dimensional printer 18, a wide range of resin materials from an inexpensive resin material to a high-performance resin material (e.g., a resin material providing high refractive index after being cured) can be used, and therefore, a resin material having sufficient performance as the spectacle lens 50 can be used.

Next, the lens curing means 44 heats the lens mold 42 having the resin material therein, and cures the resin material to form the unfinished spectacle lens 45 made of the heat-curable resin. When the resin material is cured in the lens mold 42, the front lens mold 21 and the rear lens mold 24 having sufficiently smooth rear surface 21a and front surface 24a, such as those made of glass, can be used, whereby the front surface and the rear surface of the spectacle lens 50, which are optically important, are formed so as to have sufficient performance as the spectacle lens.

Subsequently, the demolding means 46 takes out the unfinished spectacle lens 45 from the lens mold 42. For example, the demolding means 46, by using a robot hand, separates at least one of the front lens mold 21, the rear lens mold 24, and the side peripheral lens mold 33, and takes out the unfinished spectacle lens 45. Alternatively, the demolding means 46 puts the lens mold 42 having the unfinished spectacle lens 45 into a liquid storage tank for washing or the like, and takes out the unfinished spectacle lens 45 which has been separated from the lens mold 42 due to an action of the liquid in the liquid storage tank (in the liquid). The front surface of a portion, of the unfinished spectacle lens 45, to be the spectacle lens 50 is formed so as to have a radius of curvature of 200.00 mm according to the rear surface 21a of the front lens mold 21. The rear surface of a portion, of the unfinished spectacle lens 45, to be the spectacle lens 50 is formed so as to have a radius of curvature of 100.00 mm according to the front surface 24a of the rear lens mold 24. The front lens mold 21 and the rear lens mold 24 are recovered, and returned to the corresponding stokers (the front lens mold stocker 22 and the rear lens mold stocker 26) after being washed as appropriate.

Then, the lens curing device 19 transfers the taken-out unfinished spectacle lens 45 to the finish cutting device 20 by using transfer means (not shown). The transfer means of the lens curing device 19 holds the handling portion 45a of the unfinished spectacle lens 45 and thereby can handle the unfinished spectacle lens 45 without touching the portion to be the spectacle lens 50.

The finish cutting device 20 has received the contour shape data 51 and the edge type data 52 transmitted from the server 2 in S7 and stored these data therein. Upon receiving the unfinished spectacle lens 45 corresponding to these data (having the same identification mark as the identification mark regarding these data), the finish cutting device 20 cuts the unfinished spectacle lens 45 on the basis of these data, thereby to finish the spectacle lens 50 (S11).

Specifically, the finish cutting device 20 fixes the unfinished spectacle lens 45 by using a soft-touch chuck, and cuts off the handling portion 45a by using the cutting means 54, thereby to manufacture the spectacle lens 50 according to the prescription data 6 (S power or the like), the contour shape data 51 (including the eye point E), and the edge type data 52. The finish cutting device 20 selects, as a grindstone of the cutting means 54, a grindstone having a surface corresponding to the edge shape regarding the edge type data 52, and causes the grindstone of the cutting means 54 to move such that a line along which the handling portion 45a is to be cut off coincides with the contour shape data 51. The finish cutting device 20 may not form the edge according to the shape of the grindstone surface, but may form the edge by three-dimensional NC control cutting based on edge shape data calculated in advance, or may form the edge after performing cutting into a size larger than the contour shape data 51 or after performing rough cutting. Still alternatively, the finish cutting device 20 may cut or grind the edge other than the connection portion of the handling portion 45a of the spectacle lens 50.

Since the finish cutting device 20 completes the cutting by only cutting off the handling portion 45a, the cutting time is shortened, and efficiency is improved. In addition, the wasted portion of the resin is only the handling portion 45a.

Figure 8:
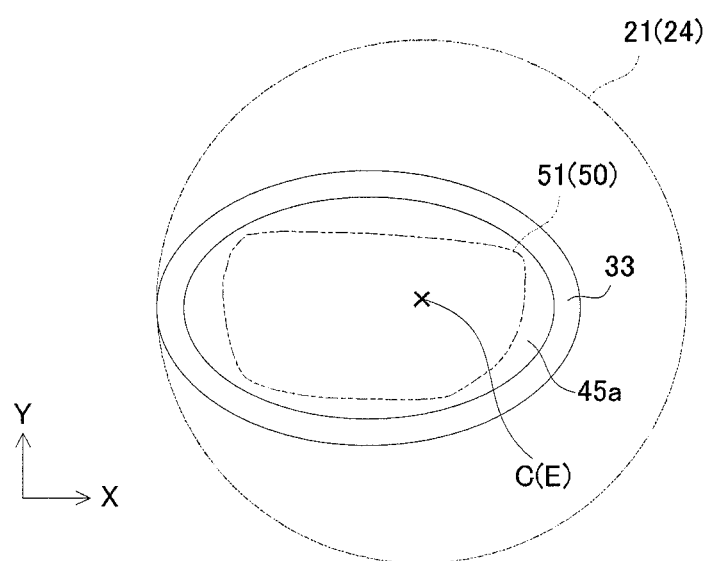
FIG. 8 is a front view according to a modification of the side peripheral lens mold.

As shown in FIG. 8, the server 2 may calculate, as the side peripheral lens mold shape data 32, data having, at the inner surface, a minimum elliptical cylindrical surface that is apart from the contour shape data 51 by a predetermined distance or more. Then, the three-dimensional printer 18 may form an elliptical ring-shaped side peripheral lens mold 33, the lens curing device 19 may cure the unfinished spectacle lens 45 having an elliptical side periphery, and the finish cutting device 20 may cut the unfinished spectacle lens 45 in accordance with the contour shape data 51 and the edge type data 52 to manufacture the spectacle lens 50. Also in this case, since a portion of the unfinished spectacle lens 45 other than the spectacle lens 50 becomes the handling portion 45a, handling is facilitated, and the usage amount of the resin material is reduced, whereby efficiency of cutting is improved as compared to the case of cutting a round lens. Since the side peripheral lens mold 33 has the elliptical shape, the amount of calculation is relatively small. Further, the shape of the unfinished spectacle lens 45 is unified to the elliptical shape, and the handling portion 45a is formed over the entire side periphery, whereby handling is facilitated in process steps after manufacture of the unfinished spectacle lens 45, including transfer to the finish cutting device 20. When only predetermined types of side peripheral lens mold shape data 32 are prepared, the server 2 may select the minimum type of side peripheral lens mold shape data 32 which can include the entirety of the shape regarding the contour shape data 51.

The side peripheral lens mold shape data 32 may be generated so as to represent an inner surface shape that coincides with the side periphery of the spectacle lens 50 represented by the contour shape data 51 (and the edge type data 52). The spectacle lens 50 may be cured in the contour shape or the rim shape to omit the greater part or the whole of the finish cutting. The finish cutting device 20 may be installed on the orderer side, or may be omitted.

Alternatively, after manufacture of the spectacle lens 50 by the finish cutting device 20 and the like or after manufacture of the unfinished spectacle lens 45 (before finish cutting), at least one type of film may be formed on at least one of the front surface, the rear surface, and the side periphery surface (edge) of the spectacle lens 50 or the unfinished spectacle lens 45. For example, an optical multilayer film (antireflection film or the like) in which low refractive index layers and high refractive index layers of an inorganic oxide are alternately layered, a hard coating film, a water proof film, an antifouling film, a polarizing film, a light shielding film, or a combination thereof may be formed. A similar film may be formed on a similar portion of the unfinished spectacle lens 45 in a process step after manufacture of the unfinished spectacle lens 45 by the lens curing device 19 (between the lens curing device 19 and the finish cutting device 20).

After manufacture of the spectacle lens 50 by the finish cutting device 20 and the like or after manufacture of the unfinished spectacle lens 45 (before finish cutting), the spectacle lens 50 or the unfinished spectacle lens 45 may be colored. Coloring of the spectacle lens 50 or the unfinished spectacle lens 45 can be performed by coloring using a pigment, dyeing using a dye, coloring to the lens material, addition of a coloring film, or a combination thereof.

The spectacle lens 50 manufactured as described above is inspected as appropriate, and sent to the place where the order was made or a place specified by the ordering side. The server 2 may receive data indicating these places and store the data therein in advance. The server 2 may also receive information about settlement regarding the spectacle lens 50 and store the information therein in advance, and may access a settlement-side server computer or the like as appropriate by using the settlement information to perform settlement of the spectacle lens 50.

On the ordering side or the like, the spectacle lens 50 is fitted into the corresponding spectacle frame F to complete spectacle glasses.

The spectacle lens manufacturing system 1 repeats the above-described operation as appropriate for each identification mark. In a case of, for example, ensuring the inventories of predetermined unfinished spectacle lenses 45 and spectacle lenses 50, the spectacle lens manufacturing system 1 may manufacture these lenses without obtaining the identification mark, the contour shape data 51, and the like. In this case, a portion or the whole of the lens mold 42 may be reused after being washed as appropriate.

<<Operational Effects and the Like>>

The spectacle lens manufacturing system 1 described above includes the resin material filling means 43 (lens material filling means) which fills the lens mold 42 with a lens material (heat-curable resin material), and at least a portion of the lens mold 42 is formed by the three-dimensional printer 18.

Specifically, the spectacle lens manufacturing system 1 includes the lens mold 42 to be filled with the lens material, and the three-dimensional printer 18 which discharges a curable liquid resin. The three-dimensional printer 18 forms at least a portion of the lens mold 42 by discharging the liquid resin.

Therefore, the spectacle lens 50 is formed in an optional shape according to the lens mold 42 formed in an optional shape. As compared to the case where a spectacle lens is formed directly by the three-dimensional printer 18, the spectacle lens 50 can be formed with improved optical performance and physical performance because of absence of a restriction that a lens material usable in the three-dimensional printer 18 should be used. Under present circumstances, a spectacle lens having an optional shape, which is formed from a lens material available at reasonable cost in the three-dimensional printer 18, cannot have sufficient optical performance and physical performance (equal to or higher than those of an existing common spectacle lens). On the other hand, in the spectacle lens manufacturing system 1, the three-dimensional printer 18 is used for formation of the lens mold 42, and a portion of the unfinished spectacle lens 45 which is defined by the lens mold 42 formed by the three-dimensional printer 18 is subjected to finishing work as appropriate, whereby the spectacle lens 50 having the optional shape is manufactured so as to have sufficient optical performance and physical performance.

The lens mold 42 includes the front lens mold 21 having the rear surface 21a that defines the front surface of the spectacle lens 50, the rear lens mold 24 having the front surface 24a that defines the rear surface of the spectacle lens 50, and the side peripheral lens mold 33 having the inner surface that defines the side periphery of the spectacle lens 50, and the three-dimensional printer 18 forms the side peripheral lens mold 33. Therefore, the unfinished spectacle lens 45 is formed in a shape close to the spectacle lens 50, or the spectacle lens 50 having a desired rim shape (contour shape, or a combination of contour shape and edge shape) is directly formed, whereby the amount of the lens material used and the work amount for the unfinished spectacle lens 45 are reduced.

Further, the contour shape input means 68 (or the communication means 12 of the server 2, or the like) is provided, which obtains the contour shape data 51 indicating the contour shape of the spectacle lens 50. The three-dimensional printer 18 forms the inner surface of the side peripheral lens mold 33 into a shape according to the contour shape data 51. Therefore, the external shape of the spectacle lens 50 is formed into a desired shape according to the rim shape and the like of the spectacle frame F, whereby the usage amount of the lens material and the work amount for the unfinished spectacle lens 45 are reduced.

The contour shape data 51 is transmitted from the terminal 4 which is an orderer side computer. Therefore, the spectacle lens 50 having the shape according to the rim shape and the like is manufactured without receiving the spectacle frame F itself from the orderer.

Further, the three-dimensional printer 18 forms the inner surface of the side peripheral lens mold 33 into a shape in which the handling portion 45a to be held instead of a portion to be the spectacle lens is added to the shape indicated by the contour shape data 51. Therefore, in the unfinished spectacle lens 45, the handling portion 45a is formed to be a portion other than the inner portion of the contour shape data 51, the inner portion being to be the spectacle lens 50. In the process steps after manufacture of the unfinished spectacle lens 45, the unfinished spectacle lens 45 can be easily handled by holding the handling portion 45a, and the portion to be spectacle lens 50 is protected. In particular, if the shape of the handling portion 45a is made constant or within a predetermined range, tools to be used in the process steps after manufacture of the unfinished spectacle lens 45 need not be prepared for different shapes of the unfinished spectacle lens 45. Thus, the number of types of the tools can be reduced, or tools need not be formed so as to correspond to various shapes of the unfinished spectacle lens 45, and therefore, the tools are prevented from being complicated. Since the handling portion 45a reaching the side periphery of the front lens mold 21 or the rear lens mold 24 is formed, the filling port J through which the lens mold 42 is filled with the lens material is provided.

Furthermore, the input means 66 (or the communication means 12 of the server 2, or the like) is provided, which obtains the edge type data 52 indicating the edge shape of the spectacle frame F into which the spectacle lens 50 is fitted. The three-dimensional printer 18 forms the inner surface of the side peripheral lens mold 33 (portion other than the connection portion of the handling portion 45a) into a shape according to the edge type data 52. Therefore, the spectacle lens 50 (unfinished spectacle lens 45), having the edge shape such as the bevel shape or the groove shape, is formed by the lens mold 42.

The edge type data 52 is transmitted from the terminal 4 which is the orderer side computer. Therefore, the spectacle lens 50 having the edge shape according to the desired edge type is manufactured without receiving the spectacle frame F itself from the orderer.

In addition, the front lens mold 21 and the rear lens mold 24 are made of glass. Therefore, the front surface and the rear surface of the spectacle lens 50, which are optically important as compared to the side periphery, are formed with sufficient smoothness. In addition, the front lens mold 21 and the rear lens mold 24 are reusable, whereby the cost is reduced.

In the spectacle lens manufacturing system 1, since the lens material is a heat-curable resin material, the spectacle lens 50 made of the heat-curable resin is manufactured such that the spectacle lens 50 is excellent in optical performance and physical performance and easy to be handled. Moreover, the spectacle lens 50 is easy to be manufactured and managed, for example, easy to be poured into the lens mold 42 and easy to be cured in the lens mold 42.

Further, in the spectacle lens manufacturing system 1, the three-dimensional printer 18 includes the UV irradiation means 35 which cures the liquid resin, and the liquid resin is a UV-curable resin. Since the UV-curable resin is cured by the UV irradiation means 35, (a portion of) the lens mold 42 can be easily formed. In particular, when the lens curing device 19 pours the lens material into the lens mold 42 and cures the lens material by heating to manufacture the unfinished spectacle lens 45, the lens material can be cured without heating the lens mold 42. Thus, an adverse effect is avoided that, for example, curing is started while the lens material is poured, which may occur if the lens mold 42 is heated.

Even in the case where the liquid resin is a heat-curable resin, and the lens mold 42 is manufactured through curing by heating (the curing means is heating means), and further, the lens curing device 19 pours the lens material into the lens mold 42 and cures the lens material by heating to manufacture the unfinished spectacle lens 45 (the lens curing means is also heating means), if the curing temperature of the lens material is higher than the curing temperature of the lens mold 42, the lens mold 42 is preheated during manufacture while avoiding the adverse effect described above, whereby efficiency of curing of the lens material using the lens mold 42 is improved.

The liquid resin may be a naturally-curing resin that is cured due to change in components thereof after being discharged. Examples of the naturally-curing resin may include a resin, such as an instantaneous adhesive agent or a coking agent, which reacts with components (moisture, oxygen, etc.) in the air and cures after being discharged, and a dry-curing type resin in which a part of components such as a solvent (moisture, hydrocarbon, or the like) naturally separates (evaporation or the like) after the resin is discharged, and a residual part such as a solute cures. In this case, the UV irradiation means 35 and the heating means can be omitted, whereby the structure is simplified.

Alternatively, the liquid resin may be a mixture-curing type resin which is cured by, after being discharged, introducing a specific component (water, a resin for curing, or the like), and mixing or attaching the specific component. In this case, the curing means is component-for-curing introduction means for introducing (mixing or attaching) the specific component.

The liquid resin (fluid resin) may be cured such that only the surface thereof is cured while the inside thereof is not cured.

Second Embodiment

<<Structures and the Like>>

A spectacle lens manufacturing system according to a second embodiment of the present invention, including modifications thereof, is similar to the spectacle lens manufacturing system 1 of the first embodiment. However, in the second embodiment, regarding the fluid resin discharge means, a resin discharge dispenser (dispenser) is used instead of the three-dimensional printer. Hereinafter, means, parts, and the like of the spectacle lens manufacturing system of the second embodiment, which are similar to those of the spectacle lens manufacturing system 1 of the first embodiment, are denoted by the same reference numerals as those of the first embodiment, and description thereof will be omitted as appropriate.

While the three-dimensional printer is able to cause a fluid resin to be deposited, the dispenser discharges a fluid resin without causing the fluid resin to be deposited.

Figure 9:
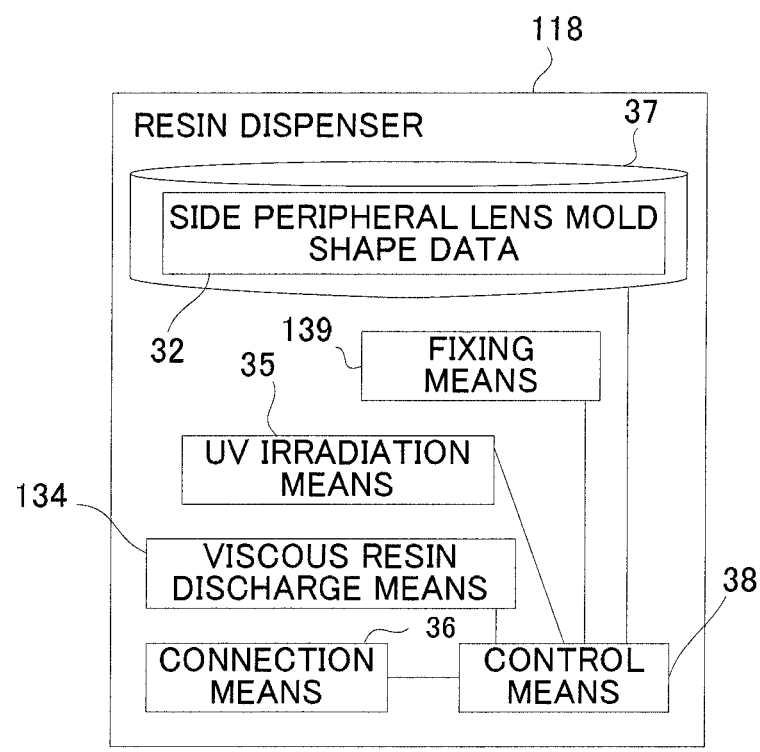
FIG. 9 is a block diagram showing a dispenser in a spectacle lens manufacturing system according to a second embodiment of the present invention.
Figure 10A:
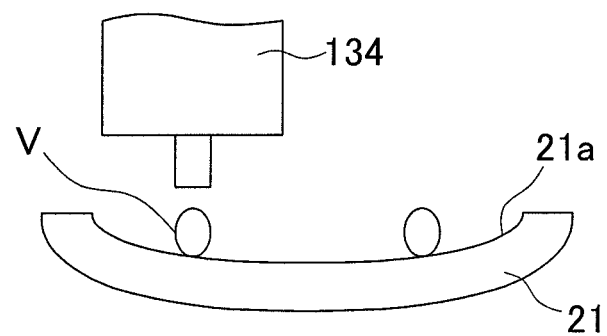
FIG. 10A is a schematic vertical elevational view showing viscous resin discharge means shown in FIG. 9 and the lens mold.
Figure 10B:
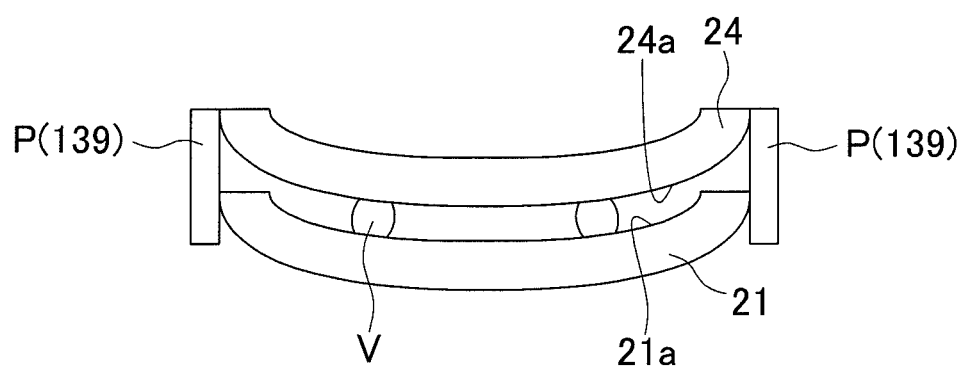
FIG. 10B is a schematic vertical elevational view showing viscous resin discharge means shown in FIG. 9 and the lens mold.

FIG. 9 is a block diagram showing a dispenser 118 included in the spectacle lens manufacturing system of the second embodiment. FIGS. 10A and 10B are vertically elevational schematic diagrams showing a lens mold 42 and viscous resin discharge means 134 in a case where a viscous resin V is discharged to the rear surface 21a of the front lens mold 21.

The dispenser 118 as fluid resin discharge means causes the viscous resin V, which is a UV-curable fluid resin having high viscosity, to cure by UV irradiation, thereby to form a side peripheral lens mold 33 having a shape based on the side peripheral lens mold shape data 32. The dispenser 118 includes viscous resin discharge means 134, UV irradiation means 35, connection means 36, storage means 37 which stores therein various data and programs, fixing means 139 which fixes the rear lens mold 24 with respect to the front lens mold 21, and control means 38 which controls these means. The viscous resin discharge means 134 discharges the viscous resin V to the rear surface 21a of the front lens mold 21 or the front surface 24a of the rear lens mold 24, which are received from the front and rear lens mold selection device 16, according to the shape of the side peripheral lens mold 33, on the basis of the side peripheral lens mold shape data 32. The viscous resin discharge means 134 does not put the viscous resin V on the viscous resin V, in other words, does not cause the viscous resin V to be deposited. The viscous resin discharge means 134 discharges the viscous resin V such that the viscous resin V has a height equal to or larger than the largest thickness in the side peripheral lens mold shape data 32. The viscous resin V has a viscosity that allows the viscous resin V to be discharged from the viscous resin discharge means 134, and that hardly causes change in shape after discharge of the resin V if there is no external force other than gravity.

By controlling the discharge amount (discharge speed) or the movement speed in the viscous resin discharge means 134, the viscous resin discharge means 134 may discharge the viscous resin V so as to respond (to some extent) to the thickness (height) of the side peripheral lens mold shape data 32. As the viscous resin V, a naturally-curing resin having viscosity, such as a coking agent including a silicon coking agent, may be used as in the first embodiment.

Thereafter, in the dispenser 118, the fixing means 139, which refers to the side peripheral lens mold shape data 32, fixes the rear lens mold 24 with respect to the front lens mold 21. The rear lens mold 24 and the front lens mold 21 are arranged at a predetermined distance based on the thickness of the side peripheral lens mold 33 indicated by the side peripheral lens mold shape data 32. An example of the fixing means 139 may be a combination of position adjustment means (a robot arm, a combination of an arm and a platform, or the like) which adjusts the relative position of the rear lens mold 24 to the front lens mold 21, and support means (a gasket, a polymerized tape P shown in FIG. 10B, or the like)

which is attached over the front lens mold 21 and the rear lens mold 24 and supports these molds. The support means may support these molds by means other than attachment, and may support either the front lens mold 21 or the rear lens mold 24. The fixing means 139 may be provided with a sensor (a non-contact sensor, a camera, or a combination thereof) for grasping a distance between the front lens mold 21 and the rear lens mold 24. The fixing means 139 may execute the fixing with the predetermined distance on the basis of (the present distance between the front lens mold 21 and the rear lens mold 24 which is detected by) the distance detecting sensor.

Then, the UV irradiation means 35 applies UV to the viscous resin V put in the shape based on the side peripheral lens mold shape data 32, and to the front lens mold 21 and the rear lens mold 24 fixed at the predetermined distance, with the viscous resin V being sandwiched therebetween, so that the viscous resin V is cured to form the side peripheral lens mold 33. Simultaneously, the front lens mold 21, the rear lens mold 24, and the side peripheral lens mold 33 are joined so that formation of the lens mold 42 is completed. The dispenser 118 transfers the lens mold 42 formed as described above to the lens curing device 19.

The viscosity of the viscous resin V is preferably not less than 500,000 mPa·s (millipascal seconds), and more preferably not less than 1,000,000 mPa·s, in order to easily keep the shape of the viscous resin V on the rear surface 21a of the front lens mold 21 or the front surface 24a of the rear lens mold 24. However, the viscosity of the viscous resin V is premised on that the viscous resin V can be discharged, and therefore, the viscosity is preferably determined taking into account both ease of discharge and ease of shape keeping as described above. The viscous resin V may be a resin that is curable by heat, or a resin that is curable by UV irradiation.

Furthermore, the side peripheral lens mold shape data 32 may be two-dimensional data other than a thickness. In addition to the two-dimensional side peripheral lens mold shape data 32 or separately from the side peripheral lens mold shape data 32, distance data may be provided, which is data of the distance between the front lens mold 21 and the rear lens mold 24 according to the thickness of the unfinished spectacle lens 45 or the spectacle lens 50 obtained from the prescription data 6. In this case, the distance data may be data regarding a distance between the center of the front lens mold 21 and the center of the rear lens mold 24, according to a planned center thickness of the unfinished spectacle lens 45 or the spectacle lens 50, data regarding a distance on the inner side of the viscous resin V (side peripheral lens mold 23), according to a planned edge thickness of the unfinished spectacle lens 45 or the spectacle lens 50, data regarding a distance between the edge of the front lens mold 21 and the edge of the rear lens mold 24, which occurs when a planned thickness of the unfinished spectacle lens 45 or the spectacle lens 50 is ensured, or a combination thereof. Regarding the distance data, distance data calculated in the server 2 may be received, or distance data may be calculated in the dispenser 118.

Alternatively, the front and rear lens mold selection device 16 may select, in addition to the front lens mold 21 and the rear lens mold 24, support means (e.g., a ring-shaped support member having projections and legs which support the rear lens mold 24 at a predetermined distance from the front lens mold 21 disposed on a base) which is prepared for each predetermined distance, or may adjust, to a predetermined distance, support means which is adjustable to any distance. Then, the front and rear lens mold selection device 16 sends the support means to the dispenser 118. The dispenser 118 may support the front lens mold 21 and the rear lens mold 24 at the predetermined distance by using the received support means. At this time, the side peripheral lens mold shape data 32 may be two-dimensional data.

Moreover, the front lens mold 21 and the rear lens mold 24 may be joined after the viscous resin V is cured (after the side peripheral lens mold 33 is formed). In addition, after the viscous resin V is cured, fixture by the fixing means 139 may be canceled before the lens molds are transferred to the lens curing device 19 or after the lens molds have been transferred to the lens curing device 19, that is, the support means may be removed.

<<Operation and the Like>>

An example of operation of the spectacle lens manufacturing system of the second embodiment is similar to the example of operation of the spectacle lens manufacturing system 1 of the first embodiment expect the operation of the dispenser 118. Regarding the operation and the like similar to that of the spectacle lens manufacturing system 1 of the first embodiment (mainly, operation other than S9 in FIG. 7), description thereof will be omitted as appropriate.

As shown in FIG. 10A, the front lens mold 21 regarding the selection (S8) by the front and rear lens mold selection device 16 is introduced into the dispenser 118, with the rear surface 21a thereof facing upward. A nozzle of the viscous resin discharge means 134 is disposed above the rear surface 21a. Then, under control of the control means 38, the nozzle of the viscous resin discharge means 134 is moved relative to the front lens mold 21 on the basis of the side peripheral lens mold shape data 32, while discharging the viscous resin V. The viscous resin discharge means 134 deposits the viscous resin V on the rear surface 21a of the front lens mold 21, in a shape according to the side peripheral lens mold shape data 32 (S9; however, S9 is executed by the dispenser 118 instead of the three-dimensional printer 18). For example, the viscous resin discharge means 134 deposits the viscous resin V in a shape based on the shape of the side peripheral lens mold 33 shown in FIG. 2.

When the viscous resin V has been put over the entirety of the shape regarding the side peripheral lens mold shape data 32, as shown in FIG. 10B, in the dispenser 118, the fixing means 139 (robot arm and polymerized tape P) fixes the rear lens mold 24 having the front surface 24a facing downward, with respect to the front lens mold 21 with a predetermined distance therebetween. Since the viscous resin discharge means 134 deposits the viscous resin V so as to have a height not less than the maximum thickness in the side peripheral lens mold shape data 32, the viscous resin V as a whole comes into contact with the front surface 24a of the rear lens mold 24. A portion of the viscous resin V is put to a height exceeding the thickness in the side peripheral lens mold shape data 32. The portion of the viscous resin V is pressed and deformed by the rear lens mold 24 fixed at the predetermined distance. Therefore, the server 2 may generate the side peripheral lens mold shape data 32 in which the deformation (particularly, inward deformation) is considered (which is extended by an amount equivalent to the inward deformation), or the dispenser 118 may convert the side peripheral lens mold shape data 32 which has been generated by the server 2 without taking the deformation into account, to data taking the deformation into account. Alternatively, the viscous resin V may be put according to the side peripheral lens mold shape data 32 which is extended with an allowance for an expected inward deformation of the viscous resin V, and a portion corresponding to the allowance may be cut off by the finish cutting device 20.

Figure 3:
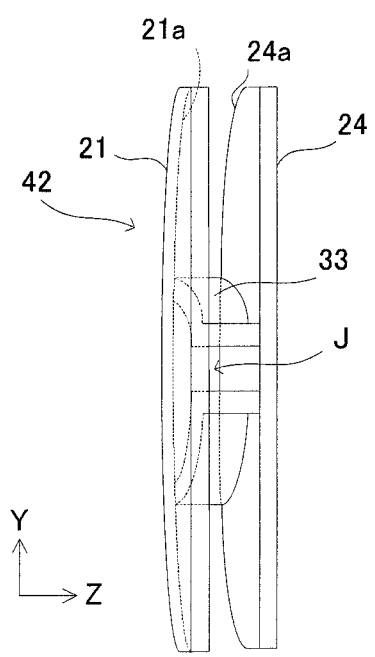
FIG. 3 is a side view of a lens mold.

Then, the dispenser 118 causes the UV irradiation means 35 to operate on the viscous resin V in the state shown in FIG. 10B, so that the entire viscous resin V is radiated with UV (at one time, or at multiple times, or for each part) to cure the viscous resin V. Formation of the side peripheral lens mold 33 is completed, and simultaneously, formation of the lens mold 42 is completed, the lens mold 42 being joined by the front lens mold 21, the rear lens mold 24, and the side peripheral lens mold 33. For example, the dispenser 118 forms the lens mold 42 as shown in FIG. 3.

The dispenser 118 sends the formed lens mold 42 to the lens curing device 19. The lens curing device 19 fills the lens mold 42 with the lens material before being cured, and causes the lens curing means 44 to cure the lens material, thereby forming the unfinished spectacle lens 45 (S10 in FIG. 4). The demolding means 45 removes the polymerized tape P when taking out the unfinished spectacle lens 45 from the lens mold 42.

<<Operational Effects and the Like>>

The spectacle lens manufacturing system of the second embodiment includes the resin material filling means 43 which fills the lens mold 42 with the lens material, and at least a portion of the lens mold 42 is formed by the dispenser 118.

Specifically, the spectacle lens manufacturing system of the second embodiment includes the lens mold 42 to be filled with the lens material, and the dispenser 118 which discharges the curable viscous resin V. The dispenser 118 forms at least a portion of the lens mold 42 by discharging the viscous resin V.

Therefore, as in the spectacle lens manufacturing system 1 of the first embodiment, the spectacle lens 50 is formed in an optional shape according to the lens mold 42 formed in an optional shape, so as to have improved optical performance and physical performance, and less waste as compared to the case of cutting from a round lens. In the spectacle lens manufacturing system of the second embodiment, the dispenser 118 which discharges the curable viscous resin V is used for formation of the lens mold 42. A portion of the unfinished spectacle lens 45 define by the lens mold 42 formed by the dispenser 118 as appropriate is subjected to finishing work. Thus, the spectacle lens 50 having the optional shape and sufficient optical performance and physical performance can be manufactured in an efficient state with less waste.

The spectacle lens manufacturing system of the second embodiment has relatively low accuracy as compared to the spectacle lens manufacturing system 1 of the first embodiment because the three-dimensional printer 18, which causes the liquid resin to deposit (accumulate) to form at least a portion of the lens mold 42, is not used. However, nonuse of the three-dimensional printer 18 realizes relatively short manufacturing time because the process of curing a lower layer and the process of accumulating the liquid resin on the lower layer are omitted. Here, "accuracy" will be specifically described. In the spectacle lens manufacturing system of the second embodiment, for example, the fixing means 139 is provided for fixing the rear lens mold 24 relative to the front lens mold 21 with a predetermined distance therebetween, so that accuracy of the shape in the height direction (Z-axis direction), which is optically most important, can be ensured. However, for example, since deformation of the viscous resin V in the X-axis direction and/or the Y-axis direction may be caused by pressing of the rear lens mold 24 onto the viscous resin V, accuracy in the X-axis direction and/or the Y-axis direction is relatively low. Such relatively low accuracy of the spectacle lens manufacturing system of the second embodiment can be covered by the finish cutting.

In particular, in a case of manufacturing a spectacle lens having a steep curve, a portion of the front lens mold 21 or the rear lens mold 24, where the side peripheral lens mold 33 is to be formed, has a difference in height. Generally, in the three-dimensional printer 18 of the first embodiment, since the nozzle fundamentally moves in the horizontal direction, it is relatively difficult to control a large difference in height, which makes control and manufacture relatively troublesome. However, in the dispenser 118 of the second embodiment, generally, there is no restriction on horizontal movement for depositing the resin, and the dispenser 118 only has to discharge a desired amount of the liquid resin circularly. Therefore, control and manufacture are relatively easy even when there is a difference in height.

In the spectacle lens manufacturing system of the second embodiment, the lens mold 42 includes the front lens mold 21 having the rear surface 21a that defines the front surface of the spectacle lens 50, the rear lens mold 24 having the front surface 24a that defines the rear surface of the spectacle lens 50, and the side peripheral lens mold 33 having the inner surface that defines the side periphery of the spectacle lens 50. The dispenser 118 forms the side peripheral lens mold 33. Therefore, the amount of the lens material used and the work amount of the unfinished spectacle lens 45 are further reduced. In addition, an appropriate device may be used in accordance with process. Specifically, the front lens mold 21 and the rear lens mold 24 of the lens mold 42, which define the front and rear surfaces of the spectacle lens 50, are optically more important and are more difficult to be post-processed. The front lens mold 21 and the rear lens mold 24 are not formed by the dispenser 118 because the greater emphasis is placed on accuracy. On the other hand, the side peripheral lens mold 33, which defines the edge, is less optically important than the front and rear surfaces and is easy to be post-processed. The side peripheral lens mold 33 is formed by the dispenser 118 because the greater emphasis is placed on shape variability.

Further, in the spectacle lens manufacturing system of the second embodiment, the fixing means 139 is provided for fixing the rear lens mold 24 relative to the front lens mold 21 with a predetermined distance therebetween. Accordingly, even when the height, on the front lens mold 21, of the viscous resin V discharged from the dispenser 118 is somewhat different from the original height (the height that the side peripheral lens mold 33 should have), the height of the viscous resin V can be adjusted to the original height when the rear lens mold 24 is arranged by the fixing means 139. Thus, the lens mold 42 for the spectacle lens 50, which allows the spectacle lens 50 to surely have an appropriate thickness that is important to achieve desired optical performance, can be easily formed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A spectacle lens manufacturing system comprising:
a lens mold to be filled with a lens material;
a curable fluid resin;
fluid resin discharge means configured to discharge tithe curable fluid resin; and
contour shape data acquisition means configured to obtain contour shape data indicating a spectacle lens contour shape,
wherein the lens mold includes a front lens mold having a rear surface that defines a spectacle lens front surface, a rear lens mold having a front surface that defines a spectacle lens rear surface, and a side peripheral lens mold having an inner surface that defines a spectacle lens side periphery, and
wherein only a portion of the inner surface of the side peripheral lens mold is defined by the curable fluid resin, and has a shape defined according to the contour shape data.

2. The spectacle lens manufacturing system according to claim 1, further comprising an orderer side computer, wherein the contour shape data is transmitted from the orderer side computer to the contour shape data acquisition means.

3. The spectacle lens manufacturing system according to claim 1, wherein the discharged curable fluid resin defines only a portion of the inner surface of the side peripheral lens mold in a shape having a handling portion on the contour shape indicated by the contour shape data, whereby the handling portion is adapted to be held instead of a portion to be the spectacle lens.

4. The spectacle lens manufacturing system according to claim 1, further comprising edge shape data acquisition means configured to obtain edge shape data indicating an edge shape of a spectacle frame into which the spectacle lens is to be fitted,
wherein the discharged curable fluid resin defining only a portion of the inner surface of the side peripheral lens mold forms a shape according to the edge shape data.

5. The spectacle lens manufacturing system according to claim 4, further comprising an orderer side computer, wherein the edge shape data is transmitted from the orderer side computer.

6. The spectacle lens manufacturing system according to claim 1, wherein at least one of the front lens mold and the rear lens mold is glass.

7. The spectacle lens manufacturing system according to claim 1, wherein the lens material is a heat-curable resin material.

8. The spectacle lens manufacturing system according to claim 1, wherein the fluid resin discharge means is a three-dimensional printer.

9. The spectacle lens manufacturing system according to claim 1, wherein the fluid resin discharge means is a resin dispenser.

10. The spectacle lens manufacturing system according to claim 1, further comprising curing means configured to cure the curable fluid resin,
wherein the curable fluid resin is a UV-curable resin, and
wherein the curing means is an UV irradiation means.

11. The spectacle lens manufacturing system according to claim 1, further comprising curing means configured to cure the curable fluid resin,
wherein the curable fluid resin is a heat-curable resin, and
wherein the curing means is a heating means.

12. The spectacle lens manufacturing system according to claim 1, wherein the curable fluid resin is a naturally-curing resin that is adapted to cure due to a change in components thereof after being discharged.

* * * * *